(No Model.)

M. J. HINDEN.
TOOL FOR PRODUCING TEST LENS RINGS.

No. 562,183.          Patented June 16, 1896.

WITNESSES:
H. O. Bailey
S. A. Cook

INVENTOR:
M. J. Hinden,
by Burridge & Cutter,
attys.

UNITED STATES PATENT OFFICE.

MATHIAS J. HINDEN, OF CLEVELAND, OHIO, ASSIGNOR TO JULIUS KING, OF SAME PLACE.

TOOL FOR PRODUCING TEST-LENS RINGS.

SPECIFICATION forming part of Letters Patent No. 562,183, dated June 16, 1896.

Application filed January 23, 1896. Serial No. 576,542. (No model.)

*To all whom it may concern:*

Be it known that I, MATHIAS J. HINDEN, a citizen of the United States, residing at Cleveland, in the county of Cuyahoga and State of Ohio, have invented a certain new and useful Tool for Manufacturing Test-Lens Rings, of which the following is a full, clear, and exact description.

My invention relates to a tool for producing test-lens rings; and it consists in the peculiar construction of said tool, as hereinafter fully set forth and especially claimed.

The object of my improvement is to provide a tool of the class designated above, which forms the lens-seat, trims the edge of the ring-rim, and pares the outside of said rim at a single operation, thereby simplifying and cheapening the manufacture of the article. This tool is designed for use upon test-lens rings which have an integral handle in order to permit a ring of this kind to be made, but may be employed in forming up a ring without a handle as well.

My tool performs its work rapidly and smoothly, leaving the ring in a finished state so far as machine-work is concerned.

That my invention may be seen and fully understood by those skilled in the art, reference will be had to the following specification and annexed drawings, forming a part thereof, in which—

Figure 1:
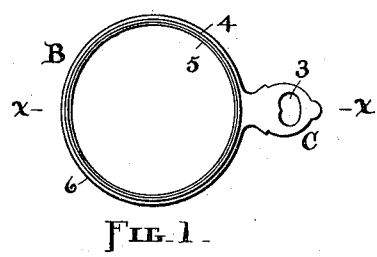
Figure 2:
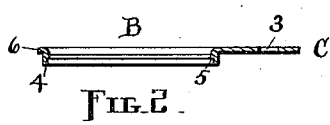
Figure 3:
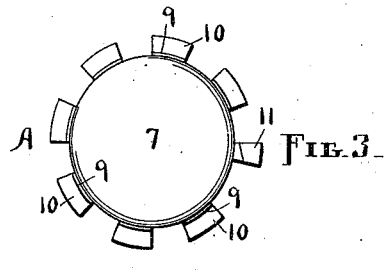
Figure 4:
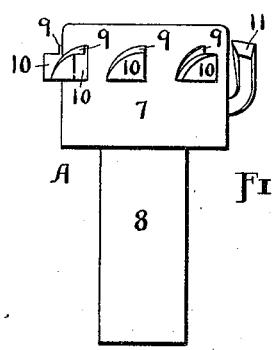

Figure 1 is a plan view of a complete ring formed by my tool; Fig. 2, a section on lines *x x*, Fig. 1; Fig. 3, a top view of said tool, and Fig. 4 a side view of the same.

Similar figures and letters of reference designate like parts in the drawings and specification.

The trimmer A, which is a tool intended for use in a lathe, consists of the head 7 and the shank 8. Projecting from the periphery of the head 7 are the cutters 9, 10, and 11, seven of each of the first two and one of the last. The cutters 9 form the inside seat 5 of the ring B by removing a part of the rim 4, while the cutters 10 trim the edge of said rim. The cutter 11 simply pares off the outside of the rim 4, which is received between the top of said cutter and the head 7. The trimmer A rapidly and accurately shapes the rim 4 for the reception of the lens. The test-lens ring B, having the integral handle C and the outside flange 6, is now complete.

The number of cutters 9 and 10 on the head 7 may be more or less than seven and more than one cutter 11 may be employed.

What I claim as my invention, and desire to secure by Letters Patent, is—

The combination in a tool for manufacturing test-lens rings, of a head, a shank, the seat-forming cutters 9, the edge-trimming cutters 10, and the paring-cutter 11, said cutters projecting from the periphery of said head the cutting edge of the last being remote therefrom, substantially as and for the purpose set forth.

In testimony whereof I affix my signature in presence of two witnesses.

MATHIAS J. HINDEN.

Witnesses:
GRANT T. WHITTLESEY,
JULIUS KING.